United States Patent
Fenton

(10) Patent No.: US 7,644,598 B2
(45) Date of Patent: Jan. 12, 2010

(54) VACUUM VALVE FOR AN I.S. MACHINE

(75) Inventor: F. Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 395 days.

(21) Appl. No.: 11/378,815

(22) Filed: Mar. 17, 2006

(65) Prior Publication Data
US 2007/0214838 A1     Sep. 20, 2007

(51) Int. Cl.
*C03B 9/00*      (2006.01)
(52) U.S. Cl. ........................... 65/263; 65/261
(58) Field of Classification Search ................... 65/263, 65/79, 66, 153, 227, 301
See application file for complete search history.

(56) References Cited
U.S. PATENT DOCUMENTS

| | | | | |
|---|---|---|---|---|
| 1,185,687 A | * | 6/1916 | La France | 65/217 |
| 1,803,001 A | * | 4/1931 | Canfield | 65/77 |
| 2,500,083 A | | 3/1950 | MacConnell | |
| 3,171,732 A | * | 3/1965 | Andersen | 65/229 |
| 3,271,127 A | * | 9/1966 | Wendle | 65/207 |
| 4,657,048 A | * | 4/1987 | Foster | 137/884 |
| 5,649,989 A | | 7/1997 | Jones | |
| 5,649,991 A | * | 7/1997 | Jones | 65/229 |
| 6,227,008 B1 | * | 5/2001 | Shetterly et al. | 65/273 |
| 6,457,331 B1 | * | 10/2002 | Kammonen | 65/263 |
| 6,907,756 B2 | * | 6/2005 | Kozora | 65/362 |
| 2004/0231363 A1 | * | 11/2004 | Monden et al. | 65/77 |

FOREIGN PATENT DOCUMENTS
EP    0705796    4/1996

* cited by examiner

*Primary Examiner*—Carlos Lopez
*Assistant Examiner*—Jodi Cohen
(74) *Attorney, Agent, or Firm*—Reinhart Boerner Van Deuren s.c.

(57) ABSTRACT

A vacuum valve for use with a blow mold in an I.S. machine. When the blow molds close around a parison, vacuum is applied to the wall of the blow mold. At some time following the application of the vacuum, final blow will occur blowing the parison into a bottle. This vacuum will be applied until the parison has been blown into a bottle. During the period during which vacuum is applied but final blow has not started, vacuum is reduced by operating a needle valve in the vacuum line.

2 Claims, 3 Drawing Sheets

VACUUM VALVE FOR AN I.S. MACHINE

The present invention relates to I.S. (individual section) machines for manufacturing glass containers, and specifically, to vacuum valves used in conjunction with the process for forming the glass bottles in these machines.

BACKGROUND OF THE INVENTION

An I.S. machine has a plurality of identical sections each of which has a blank station which receives one or more gobs of molten glass and forms them into parisons and a blow station which receives the parisons and forms them into bottles. The blow station includes a mold, including a pair of opposed side molds. The side molds are first separated to an open position so that a formed parison can be located in the blow station. The side molds are then displaced to the closed position clamping a mold bottom in the process. A blowhead is then located on top of the closed side molds to close the mold and when the parison has completed "reheat," the blowhead blows the parison into a bottle. A number of small holes are defined in the mold so that a vacuum can be applied between the outer wall of the parison and the mold surface. As the parison is blown, the vacuum draws the air, in this decreasing volume, out of the mold. In a conventional vacuum valve, a constant vacuum is applied.

OBJECT OF THE INVENTION

It is an object of the present invention to improve upon this process for removing air from the blow molds during the bottle forming process.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

DESCRIPTION OF THE PREFERRED EMBODIMENT

Figure 1:
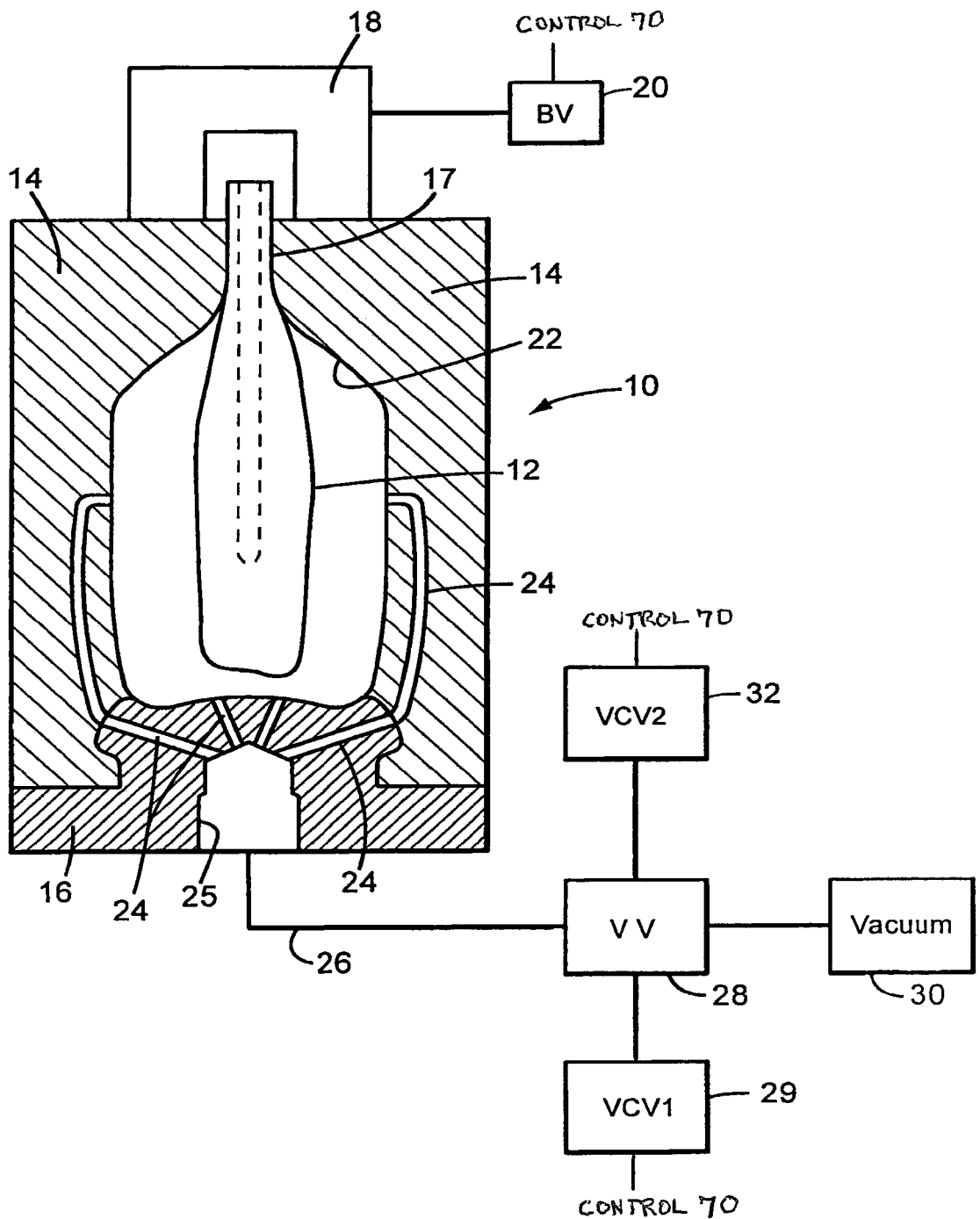
FIG. 1 is a schematic representation of a blow station of an I.S. machine prior to the blowing of a parison supported within a blow station blow mold into a bottle.

The blow station of an I.S. machine includes a blow mold 10 for each parison 12 delivered to the station. A blow mold is defined by a pair of opposing sides 14 and a bottom plate 16. The finish portion 17 of the parison 12 (which was fully defined in the prior blank station) is supported within the opening at the top of the closed mold sides and the top opening of the mold is closed by a blow head 18 which is supplied with air under pressure via a blow valve BV/20. The surface 22, defined on the inside of the mold, defines the bottle that will be formed when the parison is "blown". Located about this surface are a number of vacuum bores 24 which communicate with a vacuum inlet 25 in the base. The inlet communicates via piping 26 to a Vacuum Valve (VV/28) which communicates with a suitable source of Vacuum 30. First and second vacuum control valves (VCV1/29, VCV2/32) are operatively associated with the Vacuum Valve (VV/28).

Figure 2:
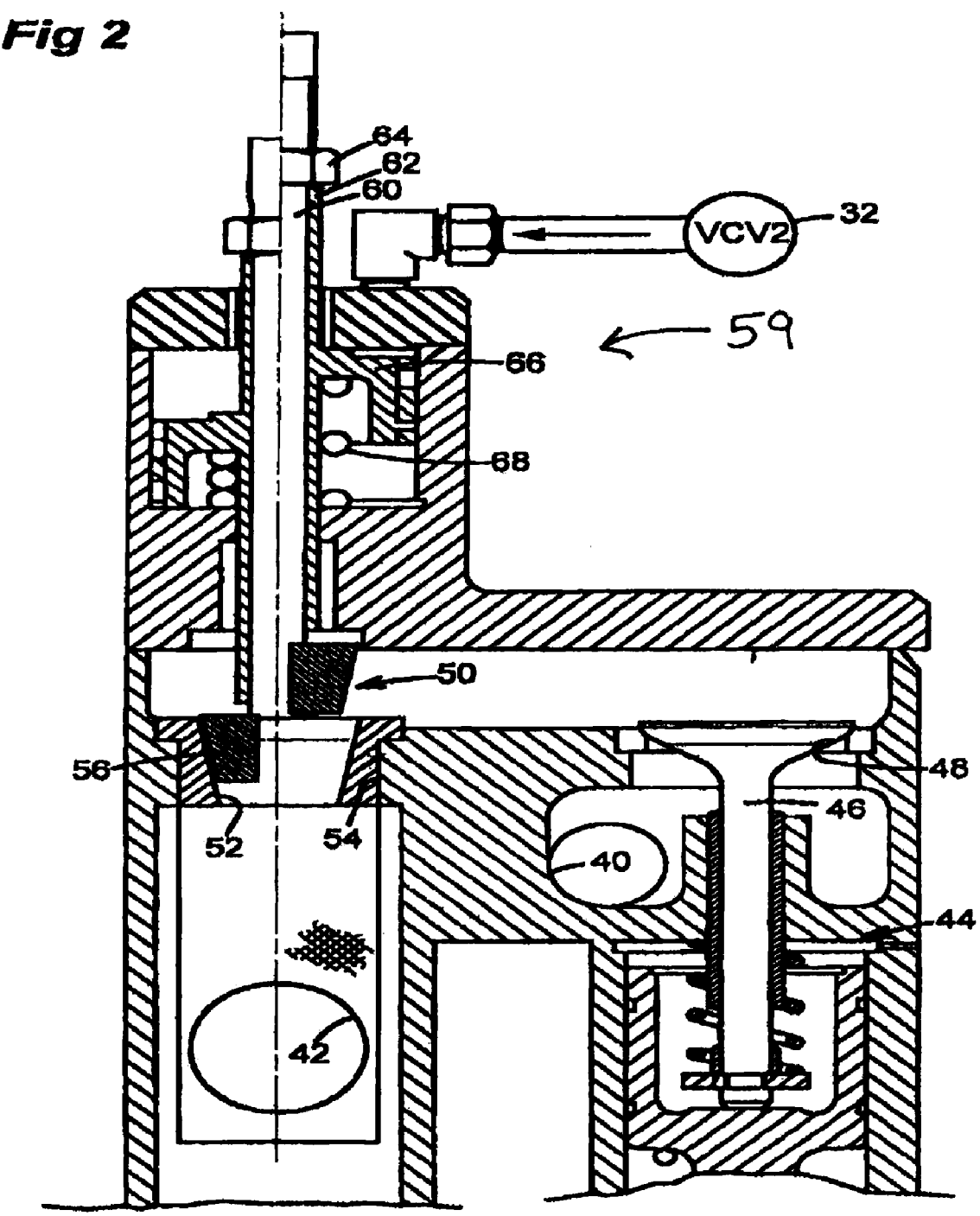
FIG. 2 is a cross sectional view of the vacuum valve shown in FIG. 1.

Referring to FIG. 2, the Vacuum Valve 28 has an inlet 40, connected to Vacuum 30, and an outlet 42 connected to the piping 26. The application of vacuum is controlled by an on-off valve 44 which includes a poppet valve 46 displaceable between a closed position (seated on the valve seat 48) and an open position where vacuum will be applied to the blow mold. The poppet valve will be displaced to the open position with the operation of the first vacuum control valve (VCV1/29).

A bipartite control valve 50 is defined between the on-off valve 44 and the vacuum valve outlet 42 by locating an annular valve seat 52, with a beveled surface, into valve body passage 54 and having a matched needle valve or operator 56 displaceable between an up, fully open position and a down position, which will partially close the bipartite control valve to a desired degree. An adjustment mechanism 59 consisting of a needle valve collar 66 which captures a compression spring 68 so that the neutral position of the bipartite control valve 50 will be the up position. By operating the second vacuum control valve (VCV2/32), air under pressure from a suitable source, is applied to the top of the collar 66, to displace the needle valve to its down position. As shown in FIG. 2, the top of the needle valve shaft 60 is threaded 62 and the desired down position will be set by adjusting the associated nut 64.

Figure 3:
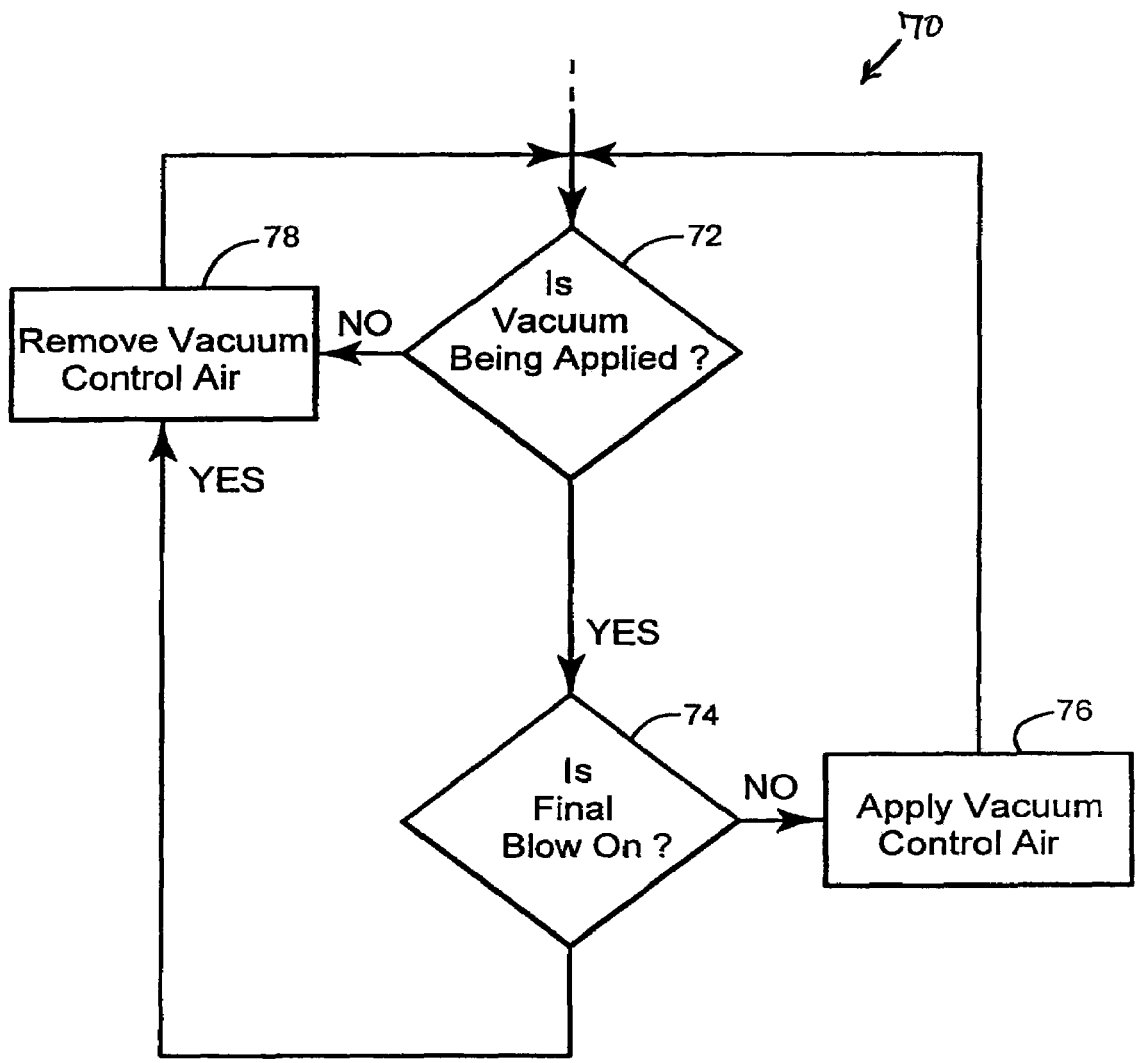
FIG. 3 is a logic diagram illustrating the operation of the control.

A control 70 for the Vacuum Valve 28 is illustrated in FIG. 3. When the control answers the query "Is Vacuum Being Applied?" 72 "no", the second vacuum control valve (VCV2/32) will be off (Remove Vacuum Control Air 78). When the answer is "yes", meaning that the on-off valve 44 has been operated to displace the normally closed poppet valve 46 to the open position, the control 70 will then determine the answer to the query "Is Final Blow On?" 74. When this answer is "no", the control will operate the second vacuum control valve 32 (Apply Vacuum Control Air 76) to lower the needle valve to its down position thereby reducing the level of vacuum applied to the blow mold to a desired level. When final blow begins (the query "Is Final Blow On?" 74 will be answered in the affirmative), the vacuum control air will be removed (Remove Vacuum Control Air 78) with the needle valve returning to its up position. Full vacuum will then be applied.

The invention claimed is:

1. An I.S. machine comprising a blow station including
a blow mold mechanism including a blow mold bottom plate having a vacuum inlet port,
a blowhead mechanism operable to apply final blow to a parison located within said blow mold mechanism to blow the parison into a bottle,
means for turning the final blow on,
a vacuum source,
a first vacuum control valve,
a second vacuum control valve,
a vacuum control mechanism defining a flow path for connecting said vacuum source to said vacuum inlet port, said vacuum control mechanism including
an on-off valve in said flow path in operative communication with said first vacuum control valve, operable from a closed position to an open position by said first vacuum control valve, and
a bipartite control valve in said flow path in operative communication with said second vacuum control valve, operable from an open position to a partially closed position by said second vacuum control valve, and
a control for the vacuum control mechanism configured to:

a) configure said bipartite control valve in said partially closed position by opening said second vacuum control valve when said on-off valve is at said open position, configured in said open position by opening said first vacuum control valve and said blowhead mechanism is not being operated to apply final blow to a parison, and
b) configure said bipartite control valve in said open position by closing said second vacuum control valve when said on-off valve is at said open position, configured in said open position by opening said first vacuum control valve and said blowhead mechanism is being operated to apply final blow to a parison.

2. An I.S. machine according to claim 1, wherein said on-off valve is a poppet valve.

* * * * *

UNITED STATES PATENT AND TRADEMARK OFFICE
CERTIFICATE OF CORRECTION

PATENT NO.        : 7,644,598 B2                                        Page 1 of 1
APPLICATION NO.  : 11/378815
DATED             : January 12, 2010
INVENTOR(S)       : F. Alan Fenton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Sixteenth Day of November, 2010

David J. Kappos
*Director of the United States Patent and Trademark Office*